Nov. 26, 1963      E. C. TAYLOR      3,112,113
FLUID SEAL
Filed Nov. 14, 1960
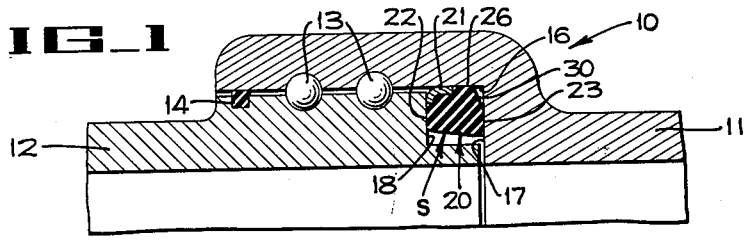
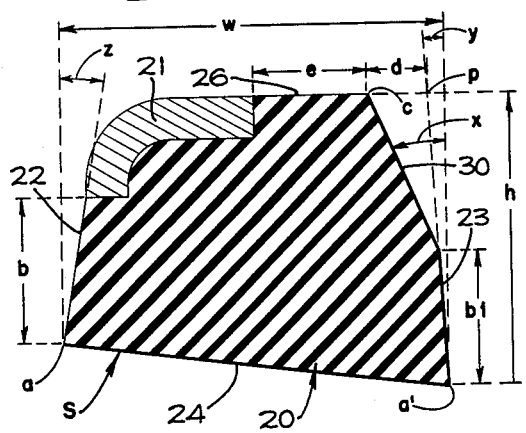
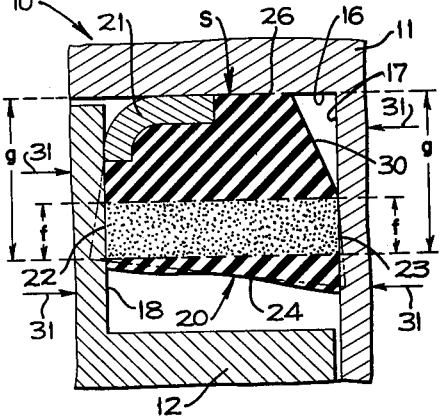
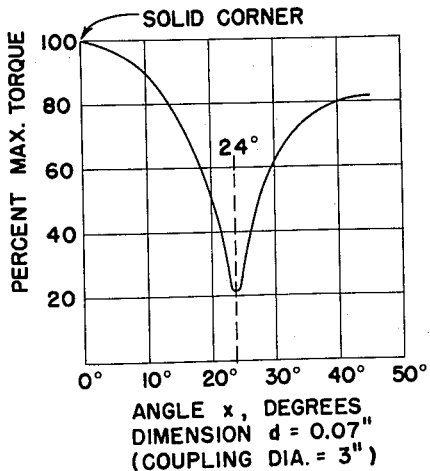
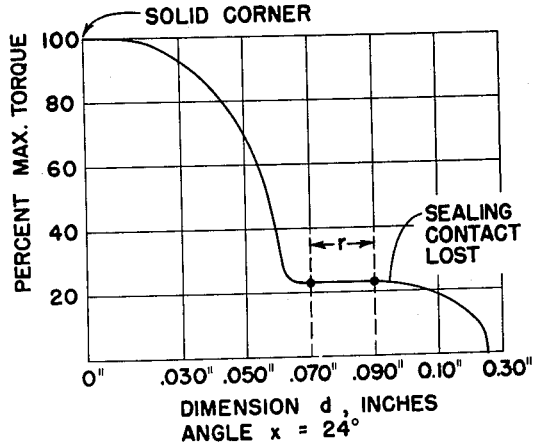
INVENTOR
ELMORE C. TAYLOR
BY *Hans G. Hoffmeister*
ATTORNEY

United States Patent Office 3,112,113
Patented Nov. 26, 1963

3,112,113
FLUID SEAL
Elmore C. Taylor, Brea, Calif., assignor, by mesne assignments, to FMC Corporation, San Jose, Calif., a corporation of Delaware
Filed Nov. 14, 1960, Ser. No. 68,795
12 Claims. (Cl. 277—95)

This invention relates to fluid seals of the fluid pressure energized type, and more particularly to seals for maintaining a fluid tight connection between relatively movable parts such as fluid conducting swivel joints wherein one joint member rotates relatively to the other, and other applications. The seal of this invention comprises an annular body of elastomeric, rubber-like material that fits into a recess formed by cooperating surfaces of the two relatively rotatable members forming the joint. For sealing super-atmospheric pressures an anti-extrusion ring is bonded to the rubber body at one outer corner of the seal, which corner is formed by the intersection of a surface on each of the two relatively rotatable members. The seal is also of the type wherein when the joint is assembled with the seal in place, seal deforming forces are applied to axially opposed, generally radial faces of the seal, which forces result from the fact that the axial width of the recess in which the seal fits is somewhat less than the axial width of the seal when the seal is in a free, unconfined and undeformed condition. The aforesaid axially opposed, generally radial faces of the seal form sealing lips, and the initial deformation of the seal upon assembly of the joint with the seal produces an initial sealing contact between the sealing lips and the radial faces of each of the members of the joint.

This initial sealing contact is thereafter maintained and augmented when fluid under pressure is introduced into the joint, because such pressure, acting upon the radially inner face of the seal (which face is fully exposed to fluid pressure within the joint) presses the opposed faces or lips of the seal ever more tightly against their respective faces of the joint members as the fluid pressure increases. Seals of this type are useful for maintaining both liquids and gases in swivel joints, pump housings, and the like.

Because of manufacturing tolerances, the spacing between the axially opposed faces of the seal receiving recess in the joint member, against which faces sealing takes place, will vary somewhat. Accordingly, the axial width of the sealing member itself must be sufficient so that adequate initial sealing contact between these faces will be provided. Initial sealing contact must be provided even when the manufacturing tolerances all add up in such a manner as to produce a sealing recess having a maximum permissible axial width. This means that when the tolerances occur in the opposite direction, that is, when there is a minimum axial spacing between the opposed faces of the members to be sealed, the initial seal deforming force that is applied to the opposed generally radial faces of the seal during assembly of the joint are considerably greater than in the previous case. It is an object of the present invention to provide a seal that will accommodate joint tolerances both in the case wherein they add up so as to produce a seal receiving recess of maximum width, and in the case wherein the recess is of minimum width, and to do so without causing the joint to require excessive rotational torque.

The problem of torque in the joint can be explained as follows: Seals of the type to which this invention relates are usually provided with an anti-extrusion ring at the corner of the seal disposed at the junction of the two members of the joint that is open to atmospheric pressure. The seal is designed so that when the two members are rotated relatively to one another, relative rotation occurs between the generally radial face or lip of the seal at the extrusion ring, and the face of the associated joint member. Since the seal is initially deformed upon assembly between opposed faces of the joint members, the friction between the aforesaid face or lip of the seal and the associated joint member, that occurs upon relative rotation of the seal and the member, generates a force that opposes such relative rotation. Thus it requires a certain torque to rotate the two members of the joint relatively to one another, even before fluid under pressure is introduced into the joint proper. There is a demand in the trade for swivel and similar joints that provide a low resistance to rotation under no fluid load conditions, that is, a joint which requires application of a relatively low torque to rotate the parts relatively to one another, to thereby provide a free turning joint.

Accordingly, another object of the invention is to minimize the torque required to rotate members of a swivel joint or the like embodying a seal of the type described.

Prior sealed joints of the type described have presented problems in connection with the manufacture, storage and subsequent shipment of the units. Although the torque required to turn the parts of the joint immediately after assembly might be relatively low or lie within an acceptable range, this initial turning torque rapidly increases as the assembled joint stands. In fact, even after an assembled joint has stood only over night, the torque required to turn the parts may be so high as to render the joint unacceptable to the trade. For certain applications it has been found that the provision of an initial lubricant between the opposed sealing faces or lips of the seal and the associated faces of the members of the joint is desirable, but in many cases even the introduction of lubricant does not correct this condition. Apparently the lubricant is squeezed out from between the faces or is otherwise rendered ineffective as the assembled joint stands, and the aforesaid increase in the torque required to turn the parts after the seal is set up remains.

Another object of the invention is to reduce the torque required to turn the parts of the joint relatively to one another after the assembled parts have stood for an appreciable time. This torque will be referred to hereinafter as the "set-up torque."

Another object of the invention is to provide a seal having the desirable torque characteristics referred to without sacrificing the fluid sealing performance of the seal.

It has been found that the set-up torque problem just described becomes aggravated as the coupling size increases. It is a further object of the invention to improve the set-up torque characteristics of couplings and joints made in the larger sizes.

Briefly, these objects are obtained in a seal of the type having an annular body of elastomeric material and which may have an anti-extrusion ring at one corner thereof, by providing the annular body with a chamfer at the face of the seal that is opposite the generally radial face adjacent the anti-extrusion ring, as will be explained in detail as this specification proceeds. It has been found, unexpectedly, that the angle of this chamfer is critical, the optimum angle being an angle of 24° with a radial plane passing through the seal. It has been found that seals formed with a chamfer as described, have optimum (minimum) torque characteristics, and that both the initial torque after assembly and the set-up torque required to rotate the parts of the joint after the seal has been standing, are reduced to a marked degree as compared to seals having other configurations. It has further been found that a certain axial dimension of the seal at the chamfer area is of importance, and that there is a range of such dimensions in which the torque requirements are at a minimum, that is, wherein optimum torque conditions are provided.

The manner in which these and other objects of the invention may be accomplished will become apparent from the following detailed description of the invention taken in conjunction with the accompanying drawings.

In the drawings:

FIG. 1 is a fragmentary section through a swivel joint embodying a seal of the invention.

FIG. 2 is an enlarged section through the seal of FIG. 1 with the latter in its free or unconfined state.

FIG. 3 is a fragmentary section through a joint embodying a seal of the invention taken on a larger scale than that of FIG. 1, and showing diagrammatically what is termed the shape factor of the seal.

FIG. 4 is a curve plotting the percent of maximum torque required to rotate the parts of the joint against the angle of chamfer of one face of the seal.

FIG. 5 is a curve plotting percent maximum torque against an axial dimension of the seal measured at the aforesaid chamfer.

Referring to the drawings, a fragmentary section of a typical swivel joint of the invention is shown in FIG. 1. It is to be understood that the seal of the invention is not limited for use in a swivel joint but can also be used in properly constructed joints between a pump shaft and its housing, and in other applications. The swivel joint is indicated generally at 10 and comprises axially aligned fluid conducting members 11 and 12 which are relatively rotatable. The usual combined anti-friction bearing balls and joint coupling members 13 are provided, there being suitable ball races formed in each of the members 11 and 12. This is in accordance with conventional practice. There is a dust seal 14 provided between the members 11 and 12 to protect the anti-friction bearing.

The seal proper is indicated generally at S and it is mounted in a recess formed by cooperating faces of the swivel joint members 11 and 12. Member 11 has an outer cylindrical face 16 and a radial face 17, the intersection of these faces forming one radially outer corner of the seal receiving recess. The joint member 12 has a radial face 18 which is opposed to, but spaced from, the radial face 17 in the other member 11. Radial face 18 cooperates with the cylindrical face 16 of the other joint member 11 to form the other radially outer corner of the seal receiving recess.

The sealing member S is formed of an annular body 20 of elastomeric material mounted in the recess. Body 20 may be formed of natural rubber, GR–S, Hycar, neoprene, Butyl, or similar elastomeric material. The elastomeric material has a Durometer of 70 to 80 on the Shore A scale. Butyl rubber is particularly effective in applications requiring the sealing of gases.

Bonded to the annular body 20 is an anti-extrusion ring 21 which ring s disposed in the corner of the seal receiving recess formed by the intersection of the radial face 18 of member 12 and the cylindrical face 16 of member 11, that is, the recess corner that is open to atmosphere. Such a ring is required in applications wherein high pressures are apt to be present within the joint. The structure described so far is conventional, and reference must be made to FIG. 2 for an understanding of the cross-sectional configuration of the seal that produces the low torque characteristics resulting from this invention.

In order to facilitate an understanding of the invention, certain dimensions and angles are indicated on FIG. 2 some of these being critical and others not. For convenience of exposition, the corner of the seal at which the anti-extrusion ring 21 is bonded in place will be considered to be the forward corner of the seal. Extending radially inwardly from the anti-extrusion ring is a generally radial face or forward sealing lip 22, formed for sealing engagement with the face 18 of member 12 of the swivel joint. Lip 22 has a radial dimension indicated at $b$ and the face of the lip is inclined relatively to a radial plane by a small angle indicated at $z$. On the opposite side of the seal there is another or rearward sealing lip 23, formed for initial light sealing engagement with the radial face 17 of the swivel joint member 11. Sealing lip 23 has a radial dimension indicated at $b1$. Rearward sealing lip 23 forms an angle $y$ with a radial plane. The radially inner surface 24 of the seal extends between corners $a$ and $a'$ at the inner edges of lips 22 and 23, respectively. Although the angle of inner surface 24, which is the surface exposed to fluid under pressure when the joint is in service, is not critical, in the embodiment of the invention illustrated in FIG. 2 the surface 24 of the seal is generally axial. At the periphery of the seal there is a rubber surface 26 that makes sealing engagement with the cylindrical face 16 of the joint member 11. This surface 26 will be referred to as the heel portion of the seal. The heel portion 26 has an axial dimension indicated at $e$ in FIG. 2. The seal has an axial width $w$ across the corners $a$ and $a'$ and a maximum height or radial cross-sectional dimension $h$, between corner $a'$ and the seal periphery.

Extending between rearward lip 23 and the heel portion 26 of the seal is a chamfer 30 which forms an important part of the invention. When this chamfer is provided in accordance with the invention, the torque characteristics of the seal are at a minimum, as previously described. The chamfer 30 forms an angle $x$ with a radial plane, which angle has been found to be critical. The optimum angle $x$ is one of 24°, but good low torque characteristics are obtainable over a range wherein angle $x$ varies between 23° and 25°. Another dimension which is critical but which provides a considerably greater critical range is the dimension $d$, previously referred to and illustrated in FIG. 2. This is the distance between a point $p$ and a point $c$, point $c$ forming the corner or intersection of the chamfer 30 and the heel portion 26. Point $p$ is a construction point. It is located at the intersection of the prolongation of the face of rearward lip 23 and the prolongation of the cylindrical surface of the heel portion 26. It has been found that with seals for joint sizes of 1½" and larger a dimension $d$ that lies within a range of 0.07 to .09 inch provides optimum results.

The critical nature of the angle $x$ for chamfer 30 is illustrated graphically in FIG. 4. In this figure the percent maximum torque is plotted against the angle $x$ in degrees. A swivel coupling having a nominal diameter of three inches was selected for the test from which the curve of FIG. 4 was made, and the dimension $d$ previously described was equal to .07 inch. With regard to the ordinate of the curve, the percent maximum torque was found to be 100 percent when the seal had little or no relief at corner $p$ of FIG. 2. Such a condition is produced by an angle $x$ of 0°, and this condition is indicated as being "a solid corner" in the curve. As corner relief is applied by increasing the angle $x$, it can be seen from the curve that the percent of maximum torque decreases. When the critical angle $x$ of 24° for the chamfer 30 is reached, the percent of maximum torque is in the order of 22 percent, and is at a minimum value. It will be noted that in the 24° zone the curve is almost a cusp, so that the percent maximum torque increases very rapidly as the angle $x$ departs from the critical angle of 24°. This reveals an unexpected criticality in the value of chamfer angle $x$.

The curve of FIG. 5 shows that there is also a critical range for the dimension $d$, described in connection with FIG. 2. This curve is taken from data for the size coupling that provided the data for FIG. 4. It will be noted that the percent maximum torque, which is the ordinate of the curve is equal to 100 percent when the dimension $d$ is zero, which condition would produce a coupling having a solid corner at point $p$, FIG. 2. As dimension $d$ is increased (angle $x$ is maintained at 24°) the percent maximum torque drops rapidly. When a dimension $d$ of .070 inch is reached the percent maximum torque reaches the minimum value of about 22 percent, as previously described. Unexpectedly enough, the curve does not have an inflection point, but rather the slope of the curve is now zero, so that further changes in dimension $d$ do not affect the percent maximum torque, which remains at the same minimum value until the dimension $d$ reaches .090 inch. This critical range of dimension $d$ is indicated at $r$ in FIG. 5, and it holds until $d=.09$ inch. At this point a further increase in dimension $d$ results in the loss of sealing contact at the rearward sealing lip $b1$.

It has been found, however, that the maximum acceptable value of dimension $d$ may depend, in certain cases, upon the diameter of the seal. For example, although a dimension $d$ of .070 to .090 inch might be suitable for a four-inch diameter seal, a dimension $d$ of .090 inch might be somewhat too large for a 1½-inch diameter seal in that sealing contact at rearward lip 23 might be lost in the higher pressure ranges. These smaller seals would operate better at higher pressures with a dimension $d$ having a somewhat smaller range $r$ than that indicated in FIG. 5.

Although the criticality of angle $x$ and the relatively narrow range of optimum values of dimension $d$ just described cannot be completely explained, a partial explanation might be given with regard to FIG. 3. It is known that when rubber (elastomeric material) is confined it acts as a fluid and hence is substantially incompressible. Even when rubber is not confined, the application of compressive forces between opposed faces of a rubber body can only produce a reduction in the distance between the faces by deforming or bulging of the rubber-like material in other directions, where it is unconfined. In this regard the action of a body of rubber under compression forces is largely determined by what is known as its "shape factor." The shape factor is equal to the fraction represented by the compressively loaded area divided by the unconfined area, which may be termed the bulge area. For example, a disc of rubber having a diameter of two inches and a thickness of ⅛ of an inch has a shape factor of 4 and would strongly resist deformation under compressive forces applied across the faces of the disc. On the other hand a body of rubber having a shape factor of less than unity can be deformed under relatively light compressive loads.

Although the diagram of FIG. 3 is not intended to provide a complete explanation of the phenomena characteristic of the present invention, it does indicate that the seal of the invention has a small shape factor. An annular section of rubber is indicated as a stippled section in the diagram, which section has a radial dimension $f$. Dimension $f$ is that of coincident opposed flat faces of the rubber engaging associated faces of the swivel joint members. This stippled body of rubber has a relatively small shape factor, and makes possible the initial deformation of the seal when assembled with the joint, without requiring excessive preload. The test results previously described indicate that the angle $x$ of chamfer 30 cooperates in a manner unknown to accommodate "bulging" of the rubber in the stippled area in a manner that renders the chamfer angle critical.

The upper limit of dimension $d$ (0.09″) can be explained as approaching the point where the radial dimension $b1$ (FIG. 2) of rearward sealing lip 23 is too small to produce an effective seal. Nevertheless, as previously explained, a seal having a compressed column of the illustrated annular shape, taken in conjunction with a chamfer 30 formed in accordance with the invention, provides a low initial torque and a low set-up torque. Yet such a seal provides adequate initial sealing so that the necessary self-sealing action is provided when fluid pressure is introduced, and the joint will not leak.

Referring again to FIG. 3, the opposed faces 17 and 18 of the joint apply compressive force the the seal indicated by arrows 31. If the chamfer 30 were not present and if the seal were provided with a solid corner, the opposed faces resisting axial deformation on assembly would have a radial dimension indicated at $g$. The shape factor of this annular body of rubber would be much higher than that of the seal of the invention, and the initial torque and a set-up torque would be greatly increased and would be unsatisfactory under many conditions.

Table I gives typical dimensions of a sealing member provided for a nominal size four-inch swivel joint. Various dimensions of the table have been discussed previously.

TABLE I

*Typical Dimensions—Seal for Four-Inch Swivel Joint*

| | |
|---|---|
| External diameter seal | 5.0″. |
| Free width, $w$ | 0.505″. |
| Free height, $h$ | 0.375″. |
| Forward lip, $b$ | 0.186″. |
| Rearward lip, $b1$ | Varies with dimension $d$. |
| Dimension $d$ | 0.07″–.09″ (critical range). |
| Heel portion $e$ | 0.120″–0.140″ (varies with $d$). |
| Forward lip angle, $z$ | 9°46′. |
| Rearward lip angle, $y$ | 3°49′. |
| Chamfer angle, $x$ | 23°–25° (critical range). |

Table II gives data obtained from a 1½-inch swivel joint with the seal of this invention. A conventional type seal having a very slight chamfer at the corner $p$, FIG. 2, was assembled in the usual manner with a conventional swivel joint. Similarly, a seal having a chamfer 30 formed at the critical angle of 24°, with the dimension $d$ equal to .07 inch, was asembled in the same size swivel joint. Table II shows that the minimum torque, that is, the torque immediately after assembly of the prior art type seal, was 35 inch-pounds. The set-up torque, that is, the torque that was found to exist after the seal had stood overnight, had increased to 250 inch-pounds. On the other hand, the seal of the invention had an assembly torque of only 7 inch-pounds, and the set-up torque, after standing overnight, had increased to only 35 inch-pounds which is no more than the assembly torque of the prior art seal.

TABLE II

*Overnight Set-Up Torque—1½-Inch Seal*

| | Torque at Assembly | Set-Up Torque |
|---|---|---|
| Slight Chamfer | 35 inch-pounds | 250 inch pounds. |
| 24° Chamfer Dim. $d=0.07″$ | 7 inch-pounds | 35 inch-pounds. |

TABLE III

*Overnight Set-Up Torque—4-Inch Seal*

| | Torque at Assembly | Set-Up Torque |
|---|---|---|
| Slight Chamfer | 100 foot-pounds | 1,060 foot-pounds. |
| 24° Chamfer Dim. $d=0.09″$ | 35 foot-pounds | 90 foot-pounds. |

Table III shows the torque data for a four-inch diameter swivel joint and seal of this invention. From this table it can be seen that with a prior art type seal, having only a slight chamfer, the torque increased from 100 foot-pounds at assembly to 1,060 foot-pounds set-up torque after the seal had stood overnight in an assembled condition. On the other hand, the seal of the invention having a 24° chamfer and a dimension $d$ of .09 inch, had an assembly torque of only 35 foot-pounds and the set-up torque after the assembly had stood overnight increased to only 90 foot-pounds of torque. This represents almost a 1,200 percent improvement in the set-up torque characteristics in the larger size coupling.

A comparison of Tables II and III indicates the extent to which the set-up torque problem is aggravated as the coupling size increases. For example, in the coupling of the prior art an increase in diameter of 167 percent (1½″ to 4″) resulted in an increase in set-up torque of 5,000 percent (250 inch-pounds to 1,060 foot-pounds). In the coupling of the invention, the set-up torque of the four-inch coupling (90 foot-pounds) represents an increase of only 332 percent over the set-up torque of the 1½-inch coupling of the prior art (250 inch-pounds). This represents a 1,500 percent improvement in the problem presented by set-up torque increase with coupling size increase.

Having completed a detailed description of the invention it can be seen that the seal of the invention and a swivel joint and seal assembly formed in accordance with the invention solve a problem that has long plagued manufacturers and users of such devices. This problem is that of resistance to rotation of the joint members, referred to as torque. The problem that arises when the assembled joint stands for a period, resulting in "set-up torque" has been particularly aggravated. By proportioning the seal proper in accordance with this invention, and by properly mounting the seal in a swivel joint, or in equivalent environments, marked and unexpected reductions in torque are attained.

The invention having thus been described, that which is claimed to be new and which is desired to be protected by Letters Patent is:

1. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with portions of both members of the joint, said annulus having a forward sealing lip extending generally radially inward from said anti-extrusion ring for sealing engagement with the face portion of one of the joint members, said annulus having a generally radial rearward sealing lip on the side opposite said forward sealing lip for sealing engagement with the face portion of the other joint member, said annulus having a chamfer extending between said rearward sealing lip and the periphery of said seal, said chamfer forming an angle of 23 to 25 degrees with a radial plane.

2. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with both members of the joint, said annulus including a forward sealing lip extending generally radially inward from said anti-extrusion ring for sealing engagement with the face portion of one of the joint members, a generally radial rearward sealing lip on the side opposite said forward sealing lip for sealing engagement with the face portion of the other joint member, and a chamfer extending between said rearward sealing lip and the periphery of said seal, said chamfer forming an angle of substantially 24 degrees with a radial plane.

3. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with portions of both members of the joint, said annulus having a forward sealing lip extending generally radially inward from said anti-extrusion ring for sealing engagement with the face portion of one of the joint members, said annulus having a generally radial rearward sealing lip on the side opposite said forward sealing lip for sealing engagement with the face portion of the other joint member, said annulus having an annular peripheral heel portion extending rearwardly from said anti-extrusion ring, said annulus having a chamfer extending between said rearward sealing lip and said heel portion and forming an angle to 23 to 25 degrees with a radial plane.

4. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with portions of both members of the joint, said annulus including a forward sealing lip extending generally radially inward from said anti-extrusion ring for sealing engagement with the face portion of one of the joint members, a generally radial rearward sealing lip on the side opposite said forward sealing lip for sealing engagement with the face portion of the other joint member, an annular peripheral heel portion extending rearwardly from said anti-extrusion ring, and a chamfer extending between said rearward sealing lip and said heel portion, said chamfer forming an angle of substantially 24 degrees with a radial plane.

5. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with portions of both members of the joint, said annulus including a forward sealing lip extending generally radially inward from said anti-extrusion ring for sealing engagement with the face portion of one of the joint members, a generally radial rearward sealing lip on the side opposite said forward sealing lip for sealing engagement with the face portion of the other joint member, an annular peripheral heel portion extending rearward from said anti-extrusion ring, and a chamfer extending between said rearward sealing lip and said heel portion, said chamfer forming an angle of 23 to 25 degrees with a radial plane, the axial distance between the intersection of said chamfer with said heel portion and the intersection of the prolongation of said rearward sealing lip with the prolongation of the cylindrical surface of said heel portion lying within the range of substantially 0.07 to 0.09 inch.

6. A fluid pressure energized seal for a joint having relatively rotatable members that cooperate to form an annular seal receiving recess, having opposed, generally radial face portions, said seal comprising an annulus of elastomeric material and an anti-extrusion ring at a forward peripheral corner of said annulus for engagement with portions of both members of the joint, said annulus having a forward sealing lip extending generally radially inward from said anti-extrusion ring for sealing engagement with the face portion of one of the joint members, said annulus having a generally radial rearward sealing lip on the side opposite said forward sealing lip for sealing engagement with the face portion of the other joint member, said annulus having an annular peripheral heel portion extending rearward from said anti-extrusion ring, said annulus having a chamfer extending between said rearward sealing lip and said heel portion, said chamfer forming an angle of substantially 24 degrees with a radial plane, the axial distance between the intersection of said chamfer with said heel portion and the intersection of the prolongation of said rearward sealing lip with the prolongation of the cylindrical surface of said heel portion lying within the range of substantially 0.07 to 0.09 inch.

7. A low torque sealed joint having two relatively rotatable members cooperating to form an annular seal receiving recess having opposed, generally radial face portions, and a seal in said recess, said seal comprising an annulus of elastomeric material and an anti-extrusion ring at a forward peripheral corner of said annulus and in engagement with portions of both members of the joint, said annulus including a forward sealing lip extending generally radially inward from said anti-extrusion ring and in sealing engagement with the face portion of one of the joint members, a generally radial rearward sealing lip on the side opposite said forward sealing lip and in sealing engagement with the face portion of the other joint member, and a chamfer extending between said rearward sealing lip and the periphery of said seal, said chamfer forming an angle of 23 to 25 degrees with a radial plane.

8. A low torque sealed joint having two relatively rotatable members, said members cooperating to form an annular seal receiving recess having opposed, generally radial face portions, and a seal in said recess, said seal comprising an annulus of elastomeric material and an anti-extrusion ring at a forward peripheral corner of said annulus and in engagement with portions of both members of the joint, said annulus including a forward sealing lip extending generally radially inward from said anti-extrusion ring and in sealing engagement with the face portion of one of the joint members, a generally radial rearward sealing lip on the side opposite said forward sealing lip and in sealing engagement with the face portion of the other joint member, an annular peripheral heel portion extending rearward from said anti-extrusion ring, and a chamfer extending between said rearward sealing lip and said heel portion, said chamfer forming an angle of 23 to 25 degrees with a radial plane.

9. A low torque sealed joint having two relatively rotatable members cooperating to form an annular seal receiving recess having opposed, generally radial face portions, and a seal in said recess, said seal comprising an annulus of elastomeric material and an anti-extrusion ring at a forward peripheral corner of said annulus and in engagement with portions of both members of the swivel joint, said annulus having a forward sealing lip extending generally radially inward from said anti-extrusion ring and in sealing engagement with the face portion of one of the joint members, said annulus having a generally radial rearward sealing lip on the side opposite said forward sealing lip and in sealing engagement with the face portion of the other joint member, said annulus having an annular peripheral heel portion extending rearward from said anti-extrusion ring, said annulus having a chamfer extending between said rearward sealing lip and said heel portion, said chamfer forming an angle of substantially 24 degrees with a radial plane.

10. A fluid pressure energized seal for a joint between relatively rotatable members, said seal comprising an annular body of elastomeric material and an anti-extrusion ring at one peripheral corner of said annular body, said seal being generally pentagonal in section, the radially outer side of the section being axial and the radially inner side of said section being generally axial, the side of said section at said anti-extrusion ring being generally radial, the opposite sides of said section consisting of a generally radial side intersecting said radially inner side, and a fifth side connecting said last named generally radial side and said radially outer side, said fifth side forming an angle of 23 to 25 degrees with a radial line through the section.

11. A fluid pressure energized seal for a joint between relatively rotatable members, said seal comprising an annular body of elastomeric material, said seal being generally pentagonal in section, the radially outer side of the section being axial and the radially inner side of said section being generally axial, one side of said section being generally radial, the opposite sides of said section consisting of a generally radial side intersecting said radially inner side, and a fifth side connecting said last named generally radial side and said radially outer side, said fifth side forming an angle of 23 to 25 degrees with a radial line through the section.

12. A fluid pressure energized seal for a joint having relatively rotatable members that cooperate to form an annular seal receiving recess, having opposed, generally radial face portions, said seal comprising an annulus of elastomeric material having a forward peripheral corner portion formed for engagement with portions of both members of the joint, said annulus having a forward sealing lip extending generally radially inward from said corner portion for sealing engagement with the face portion of one of the joint members, said annulus having a generally radial rearward sealing lip on the side opposite said forward sealing lip for sealing engagement with the face portion of the other joint member, said annulus having a chamfer extending between said rearward sealing lip and the periphery of said seal, said chamfer forming an angle of 23 to 25 degrees with a radial plane.

References Cited in the file of this patent
UNITED STATES PATENTS

| | | |
|---|---|---|
| 2,316,941 | Dodge | Apr. 20, 1943 |
| 2,330,197 | Allen et al. | Sept. 28, 1943 |